United States Patent
Mathe

(10) Patent No.: US 8,660,310 B2
(45) Date of Patent: *Feb. 25, 2014

(54) SYSTEMS AND METHODS FOR TRACKING A MODEL

(71) Applicant: Microsoft Corporation, Redmond, WA (US)

(72) Inventor: Zsolt Mathe, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,592

(22) Filed: Dec. 13, 2012

(65) Prior Publication Data

US 2013/0100129 A1    Apr. 25, 2013

Related U.S. Application Data

(63) Continuation of application No. 13/365,133, filed on Feb. 2, 2012, now Pat. No. 8,351,652, which is a continuation of application No. 12/484,592, filed on Jun. 15, 2009, now Pat. No. 8,320,619.

(60) Provisional application No. 61/182,492, filed on May 29, 2009.

(51) Int. Cl.
*G06K 9/00* (2006.01)
*G06K 9/32* (2006.01)
*H04N 7/12* (2006.01)

(52) U.S. Cl.
USPC ............... 382/103; 382/291; 375/240.08

(58) Field of Classification Search
USPC ......... 382/103–118, 154, 181, 190, 293, 294, 382/348; 348/207.99, 211.1, 46, 77, 142; 345/156–158, 173–175

See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    101254344 B    6/2010
EP    0583061 A2    2/1994
(Continued)

OTHER PUBLICATIONS

"Virtual High Anxiety", Tech Update, Aug. 1995, pp. 22.
(Continued)

*Primary Examiner* — Andrae S Allison
(74) *Attorney, Agent, or Firm* — Judy Yee; Micky Minhas

(57) ABSTRACT

An image such as a depth image of a scene may be received, observed, or captured by a device and a model of a user in the depth image may be generated. The background of a received depth image may be removed to isolate a human target in the received depth image. A model may then be adjusted to fit within the isolated human target in the received depth image. To adjust the model, a joint or a bone may be magnetized to the closest pixel of the isolated human target. The joint or the bone may then be refined such that the joint or the bone may be further adjusted to a pixel equidistant between two edges the body part of the isolated human target where the joint or bone may have been magnetized.

20 Claims, 15 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,205,231 B1 | 3/2001 | Isadore-Barreca et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,956,576 B1 | 10/2005 | Deering et al. |
| 7,003,134 B1 | 2/2006 | Covell et al. |
| 7,003,136 B1 | 2/2006 | Harville |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,068,842 B2 | 6/2006 | Liang et al. |
| 7,113,918 B1 | 9/2006 | Ahmad et al. |
| 7,116,330 B2 | 10/2006 | Marshall et al. |
| 7,121,946 B2 | 10/2006 | Paul et al. |
| 7,151,530 B2 | 12/2006 | Roeber et al. |
| 7,158,656 B2 | 1/2007 | Covell et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,227,893 B1 | 6/2007 | Srinivasa et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |

(56) References Cited

U.S. PATENT DOCUMENTS

| | | | |
|---|---|---|---|
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,526,101 | B2 | 4/2009 | Avidan |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 7,974,443 | B2 | 7/2011 | Kipman et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,253,746 | B2 * | 8/2012 | Geisner et al. ............ 345/474 |
| 8,320,619 | B2 | 11/2012 | Mathe |
| 8,351,652 | B2 * | 1/2013 | Mathe ........................ 382/103 |
| 2002/0024517 | A1 | 2/2002 | Yamaguchi et al. |
| 2004/0155962 | A1 | 8/2004 | Marks |
| 2004/0207597 | A1 | 10/2004 | Marks |
| 2005/0059488 | A1 | 3/2005 | Larsen et al. |
| 2005/0215319 | A1 | 9/2005 | Rigopulos et al. |
| 2005/0216274 | A1 | 9/2005 | Kim |
| 2006/0188144 | A1 | 8/2006 | Sasaki et al. |
| 2006/0239558 | A1 | 10/2006 | Rafii et al. |
| 2007/0013718 | A1 | 1/2007 | Ohba |
| 2007/0060336 | A1 | 3/2007 | Marks et al. |
| 2007/0098222 | A1 | 5/2007 | Porter et al. |
| 2007/0216894 | A1 | 9/2007 | Garcia et al. |
| 2007/0260984 | A1 | 11/2007 | Marks et al. |
| 2007/0279485 | A1 | 12/2007 | Ohba et al. |
| 2007/0283296 | A1 | 12/2007 | Nilsson |
| 2007/0298882 | A1 | 12/2007 | Marks et al. |
| 2008/0001951 | A1 | 1/2008 | Marks et al. |
| 2008/0026838 | A1 | 1/2008 | Dunstan et al. |
| 2008/0062257 | A1 | 3/2008 | Corson |
| 2008/0100620 | A1 | 5/2008 | Nagai et al. |
| 2008/0126937 | A1 | 5/2008 | Pachet |
| 2008/0134102 | A1 | 6/2008 | Movold et al. |
| 2008/0152191 | A1 | 6/2008 | Fujimura et al. |
| 2008/0215972 | A1 | 9/2008 | Zalewski et al. |
| 2008/0215973 | A1 | 9/2008 | Zalewski et al. |
| 2009/0085864 | A1 | 4/2009 | Kutliroff et al. |
| 2009/0141933 | A1 | 6/2009 | Wagg |
| 2009/0167679 | A1 | 7/2009 | Klier et al. |
| 2009/0221368 | A1 | 9/2009 | Yen et al. |
| 2010/0134490 | A1 * | 6/2010 | Corazza et al. ............ 345/420 |
| 2011/0157306 | A1 * | 6/2011 | Lin et al. .................... 348/43 |

FOREIGN PATENT DOCUMENTS

| | | |
|---|---|---|
| JP | 08044490 A | 2/1996 |
| JP | 2002-058045 A | 2/2002 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Aggarwal et al., "Human Motion Analysis: A Review", IEEE Non-rigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Bernier et al., "Real-Time 3D Articulated Pose Tracking using Particle Filtering and Belief Propagation on Factor Graphs", France Telecom R&D, Sep. 28, 2006, 1-10.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Grammalidis et al., "3-D Human Body Tracking from Depth Images Using Analysis by Synthesis", Proceedings of International Conference on Image Processing, Thessaloniki, Oct. 7-10, 2001, 2, 185-188.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "CONDENSATION—Conditional Density Propagation for Visual Tracking", 1998, pp. 5-28, International Journal of Computer Vision 29(1), Netherlands.

J. Vignola, J.-F. Lalonde, R. Bergevin, "Progressive Human Skeleton Fitting", Proceedings of the 16$^{th}$ Vision Interface Conference, Halifax, Canada, 2003, pp. 35-42.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Knoop et al., "A Human Body Model for Articulated 3D Pose Tracking", Humanoid Robots, New Developments, Chapter 28, Jun. 2007, 505-520.

Knoop et al., "Sensor Fusion for 3D Human Body Tracking with an Articulated 3D Body Model", Industrial Applications of Informatics and Microsystems, (no month available) 2006, 7 pages.

Kohler, "Special Topics of Gesture Recognition Applied in Intelligent Home Environments", In Proceedings of the Gesture Workshop, 1998, pp. 285-296, Germany.

(56) References Cited

OTHER PUBLICATIONS

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Li et al., "A Real-Time 3D Human Body Tracking and Modeling System", IEEE International Conference on Image Processing, Atlanta, GA, Oct. 8-11, 2006, 2809-2812.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

PCT Application No. PCT/US2010/035899: International Search Report and Written Opinion of the International Searching Authority, Dec. 22, 2010, 7 pages.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Stevens, "Flights into Virtual Reality Treating Real World Disorders", The Washington Post, Mar. 27, 1995, Science Psychology, 2 pages.

Vlasic et al., "Articulated Mesh Animation from Multi-view Silhouettes", ACM Transactions on Graphics (TOG)—Proceedings of ACM SIGGRAPH 2008 TOG Hompage vol. 27, Issue 3, Aug. 2008.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", Paper, doctoral dissertation, tech. report CMU-RI-TR-01-19, Robotics Institute, Carnegie Mellon University, Jul. 2001, 1-107.

\* cited by examiner

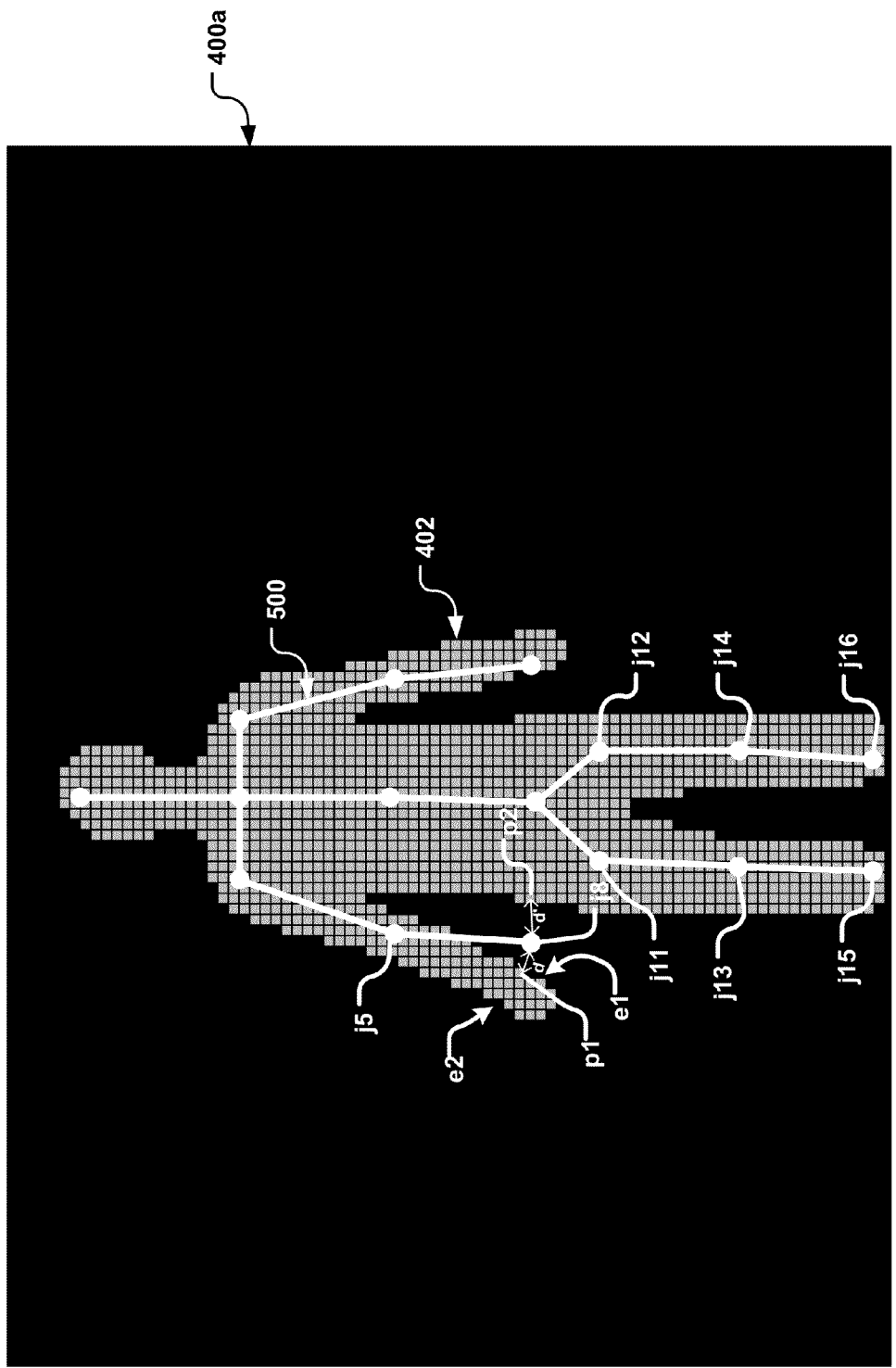

SYSTEMS AND METHODS FOR TRACKING A MODEL

CROSS-REFERENCE TO RELATED APPLICATIONS

This application is a continuation of U.S. patent application Ser. No. 13/365,133 filed on Feb. 2, 2012, now U.S. Pat. No. 8,351,652 issued Jan. 8, 2013, which is a continuation of U.S. patent application Ser. No. 12/484,592 filed on Jun. 15, 2009, now U.S. Pat. No. 8,320,619 issued Nov. 27, 2012 which claims benefit under 35 U.S.C. §119(e) of U.S. Provisional Patent Application No. 61/182,492, filed on May 29, 2009, the disclosures of which are incorporated herein by reference in their entirety.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for tracking a user in a scene. For example, an image such as depth of a scene may be received or observed. The depth image may then be analyzed to determine whether the image includes a human target associated with a user. If the image includes a human target associated with a user, a model of the user may be generated. The model may then be tracked in response to movement of the user such that the model may be adjusted to mimic a movement made by the user. For example, the model may be a skeletal model having joints and bones that may be adjusted into poses corresponding to a pose of the user in physical space. According to an example embodiment, the model may be tracked by adjusting the model to fit within a human target in a depth image of subsequent frames. For example, the background of a depth image in a frame may be removed to isolate a human target that corresponds to the user. The model may then be adjusted to fit within the edges of the human target.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 9A-9C illustrate example embodiments of a model being adjusted to fit within a human target isolated in a depth image.

DETAILED DESCRIPTION OF ILLUSTRATIVE EMBODIMENTS

As will be described herein, a user may control an application executing on a computing environment such as a game console, a computer, or the like and/or may animate an avatar or on-screen character by performing one or more gestures and/or movements. According to one embodiment, the gestures and/or movements may be received by, for example, a capture device. For example, the capture device may capture a depth image of a scene. In one embodiment, the capture device may determine whether one or more targets or objects in the scene corresponds to a human target such as the user. Each target or object that matches the corresponds to a human target may then be scanned to determine various body parts and to generate a model such as a skeletal model, a mesh human model, or the like associated therewith. According to one embodiment, the model may then be tracked. For example, the background of the depth image may be removed to isolate a human target in the depth image that may be associated with the user. The model may then be adjusted to fit within the isolated human target in the depth image.

Figure 1A:
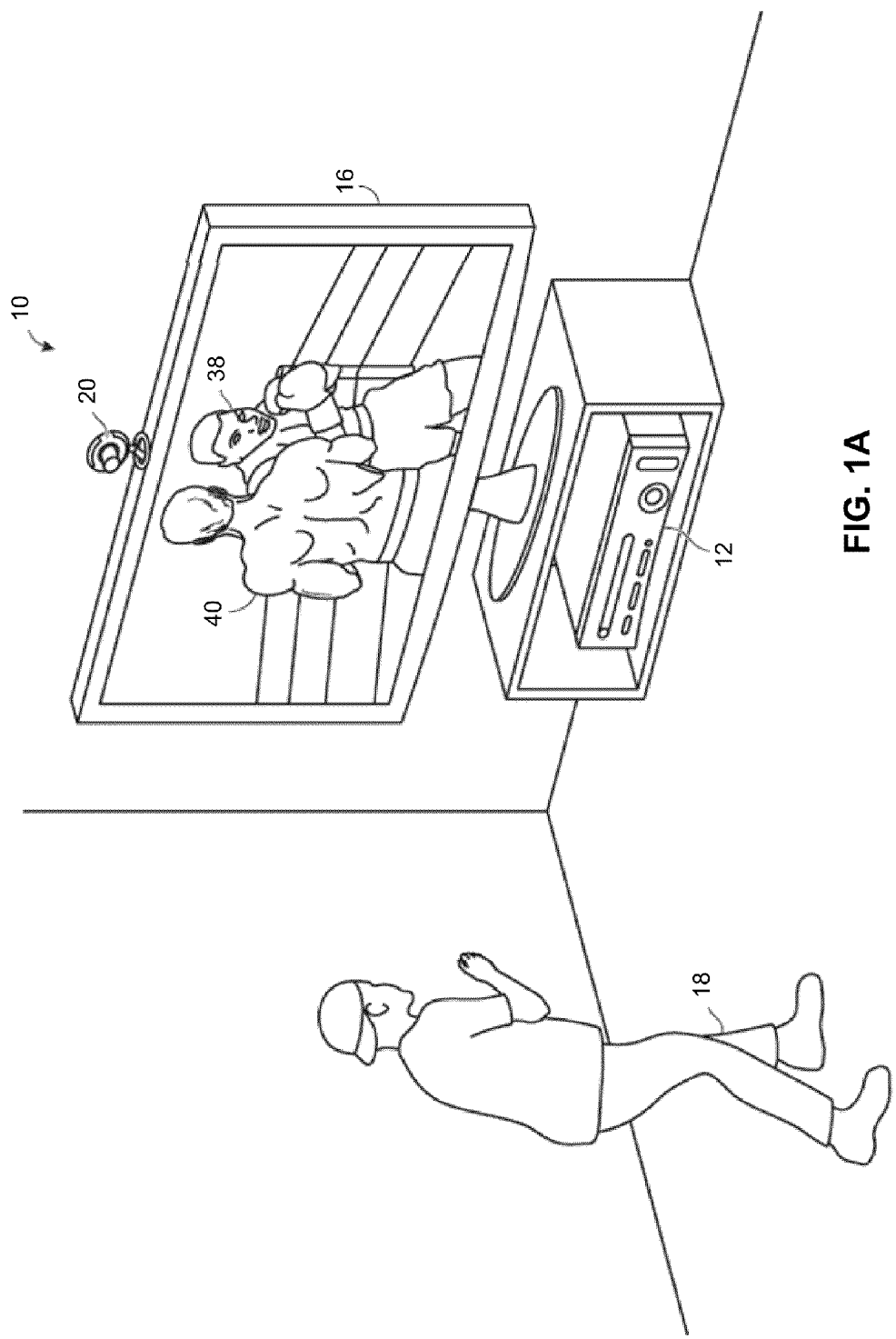
FIGS. 1A and 1B illustrate an example embodiment of a target recognition, analysis, and tracking system with a user playing a game.
Figure 1B:
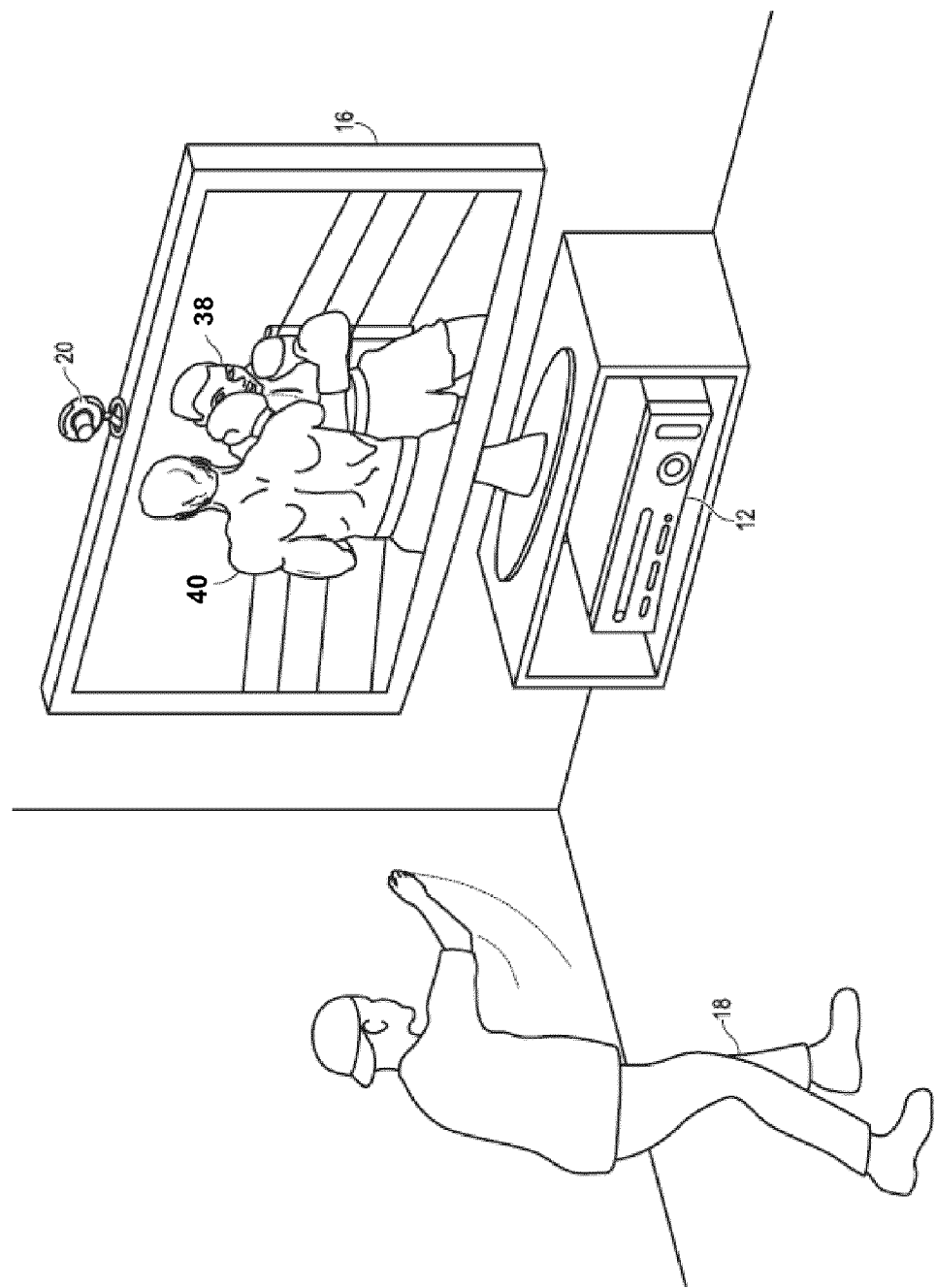

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image, removing a background of the depth image to isolate a human target, adjusting the model to fit within the isolated human target, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
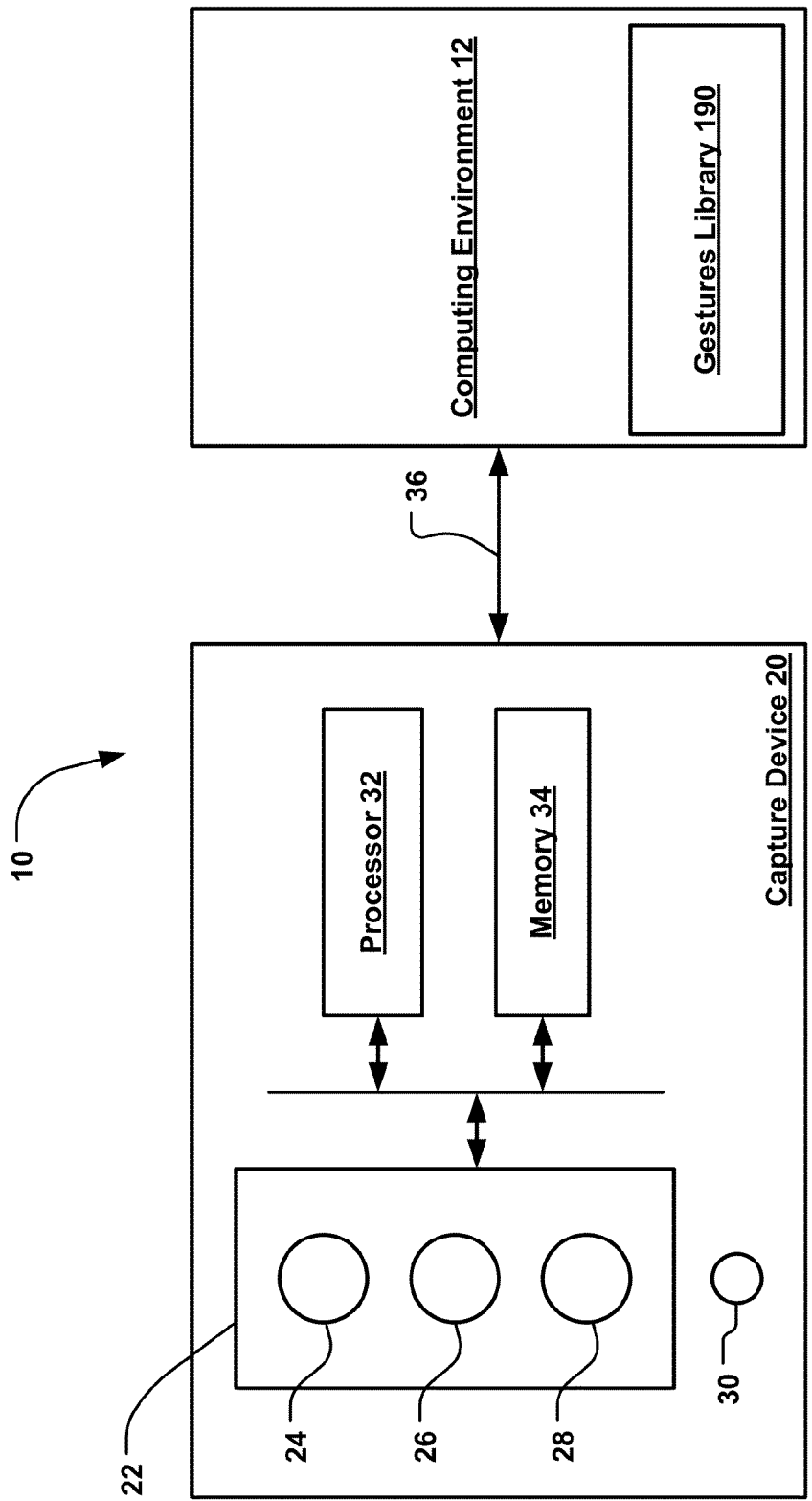
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image, removing a background of the depth image to isolate a human target, adjusting the model to fit within the isolated human target, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate an avatar or on-screen character. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
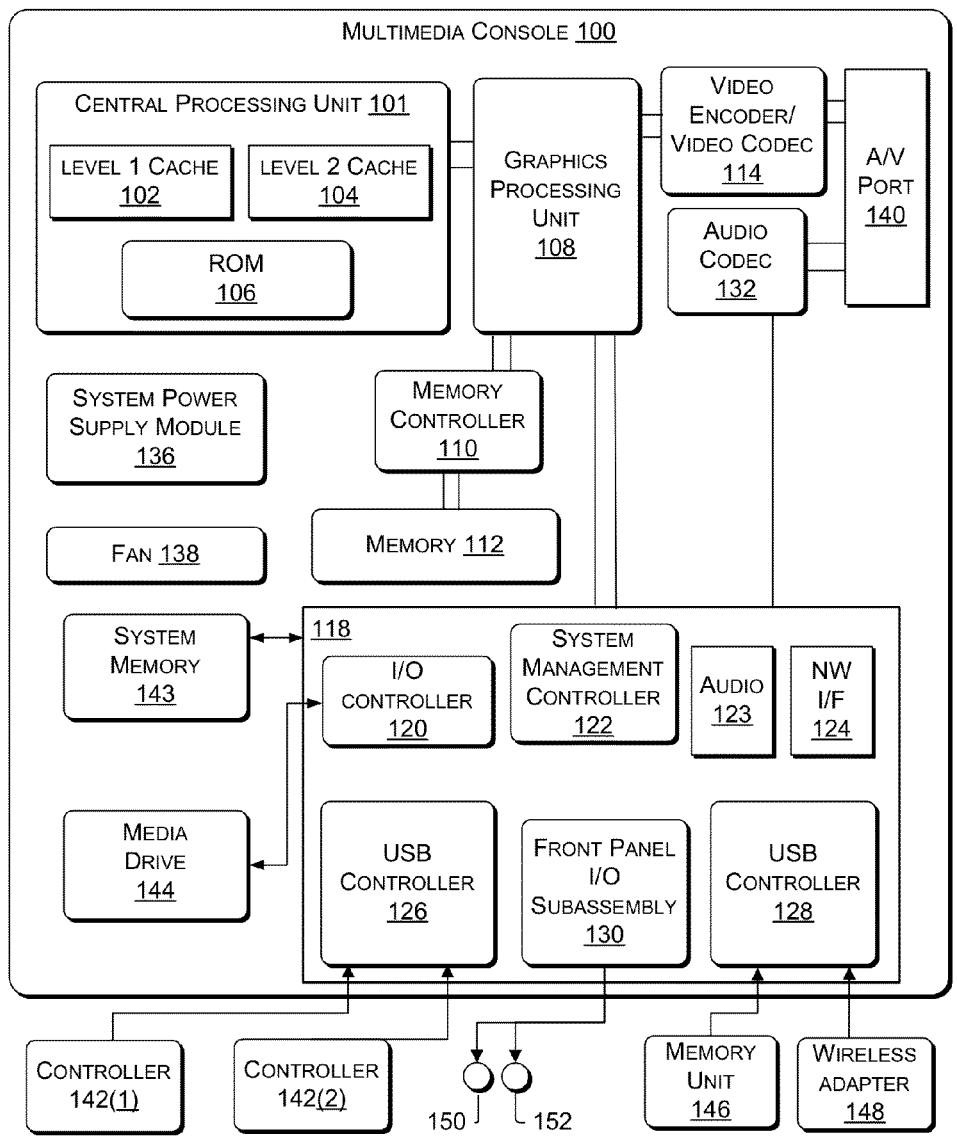
FIG. 3 illustrates an example embodiment of a computing environment that may be used to interpret one or more gestures in a target recognition, analysis, and tracking system and/or animate an avatar or on-screen character displayed by a target recognition, analysis, and tracking system.

FIG. 3 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
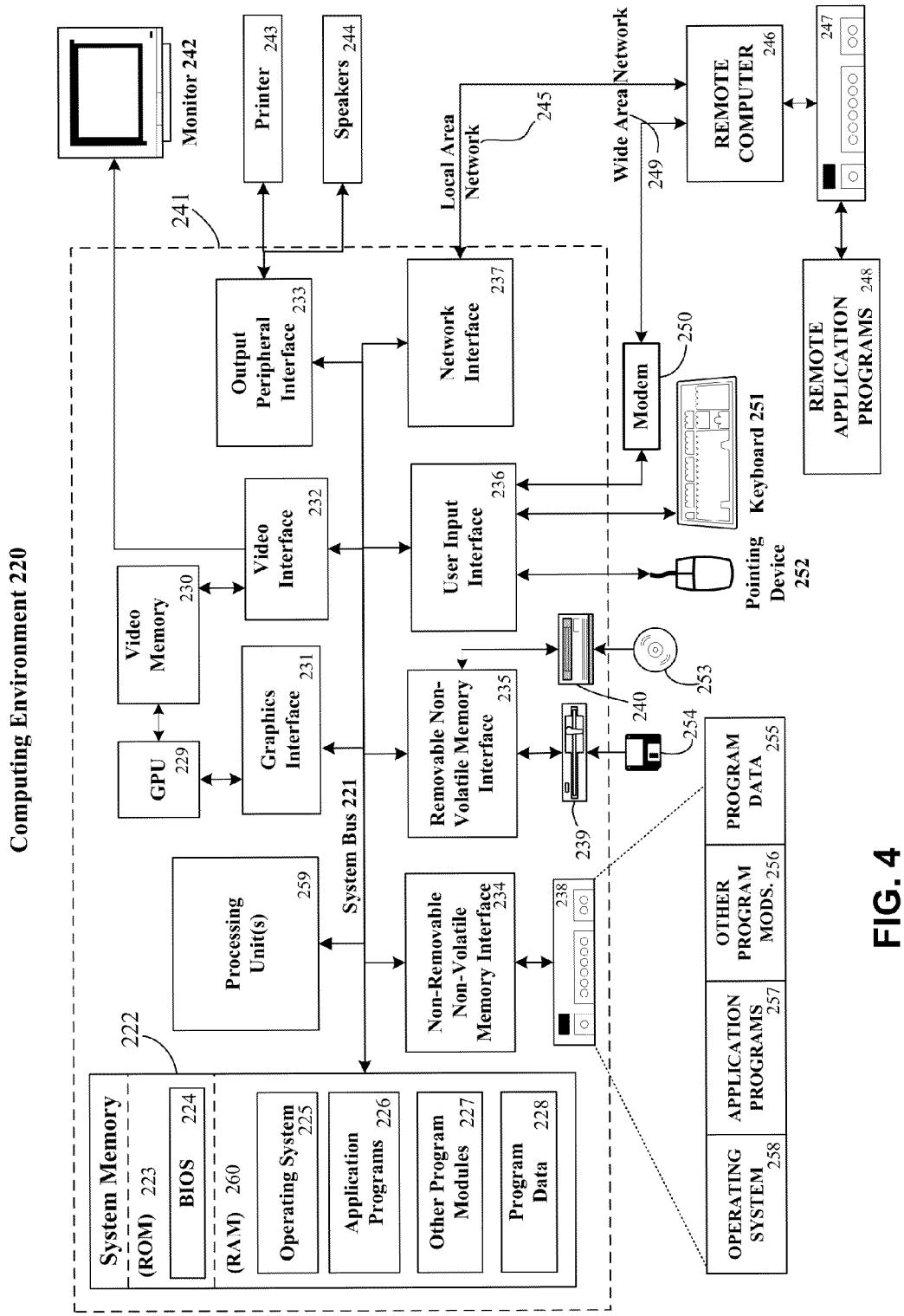
FIG. 4 illustrates another example embodiment of a computing environment that may be used to interpret one or more gestures in a target recognition, analysis, and tracking system and/or animate an avatar or on-screen character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate an avatar or on-screen character displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
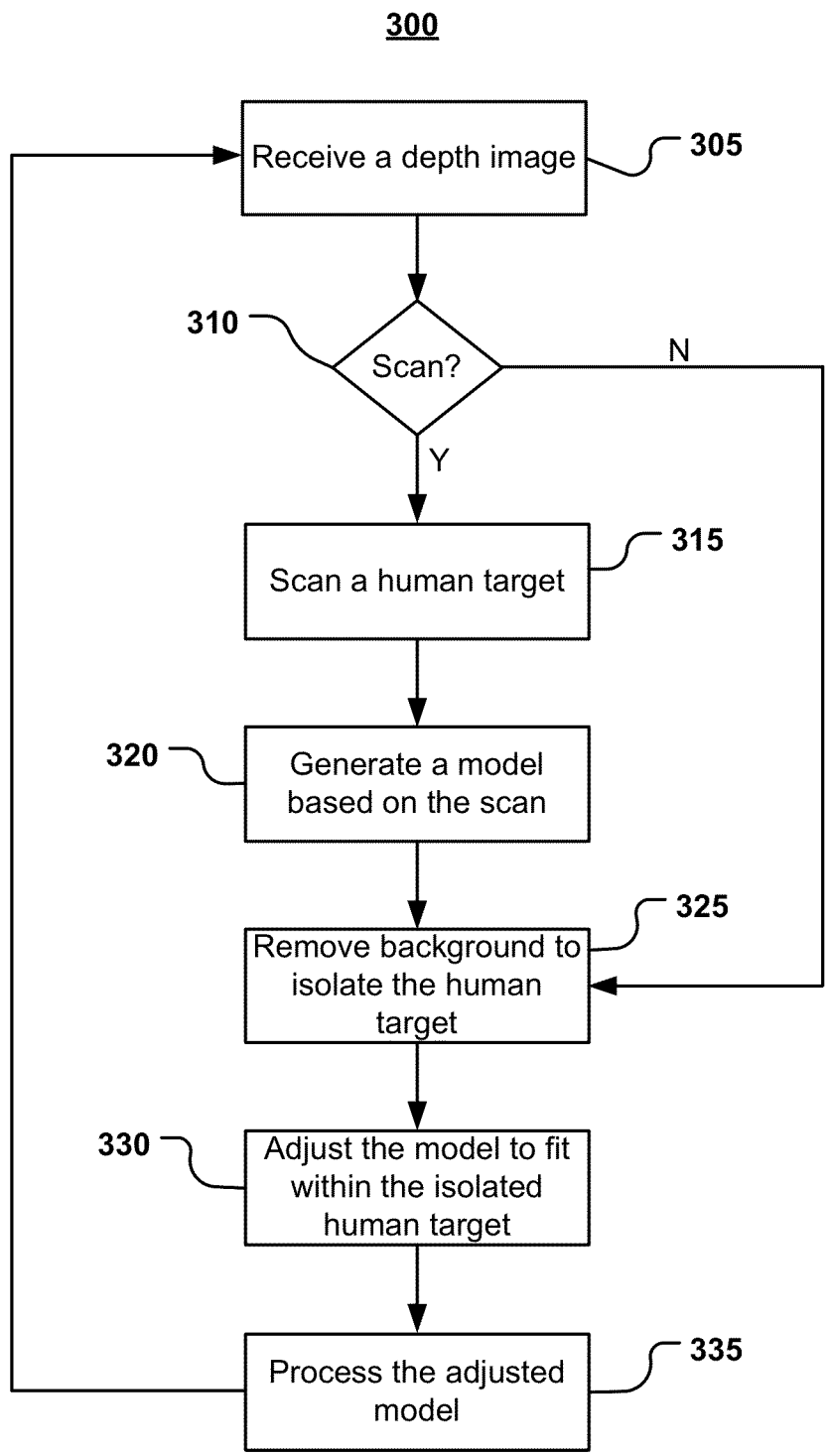
FIG. 5 depicts a flow diagram of an example method for tracking a user in a scene.

FIG. 5 depicts a flow diagram of an example method 300 for tracking a model. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, a depth image may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as an a depth image of the scene using any suitable technique such as time-of-flight analysis, structured light analysis, stereo vision analysis, or the like.

The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6:
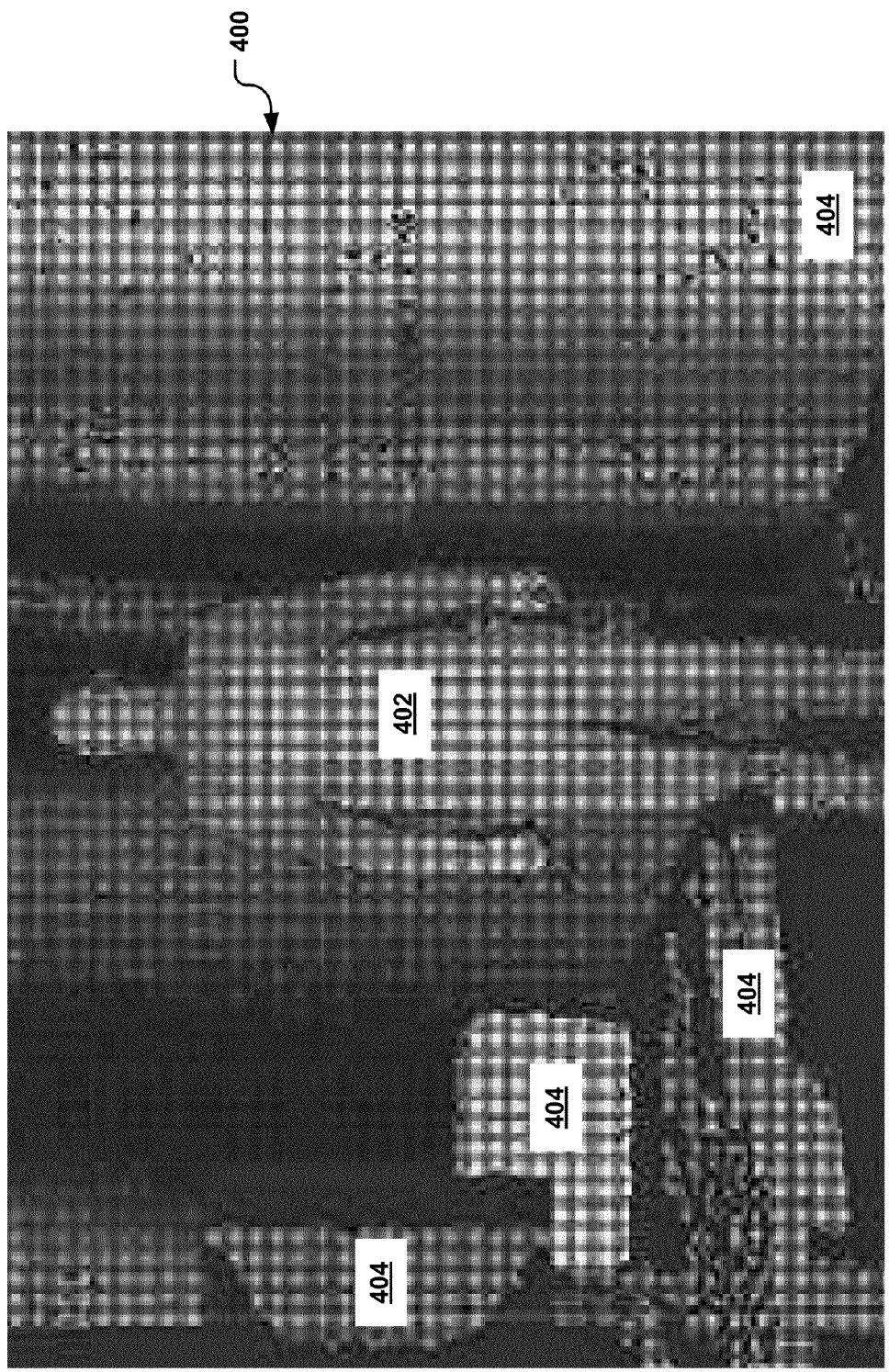
FIG. 6 illustrates an example embodiment of a depth image that may be captured or observed.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402 corresponding to, for example, a user such as the user 18 described above with respect to FIGS. 1A and 1B and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may have a depth value such as a length or distance in, for example, centimeters, millimeters, or the like of a target or object in the captured scene from the capture device. In one embodiment, the depth image 400 may be colorized such that different colors of the pixels of the depth image correspond to and/or visually depict different distances of the human target 402 and non-human targets 404 from the capture device. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the image, at 305, the image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 315, a human target in a depth image may be scanned for one or more body parts. For example, upon receiving a depth image, the target recognition, analysis, and tracking system may determine whether the depth image includes a human target such as the human target 402 described above with respect to FIG. 6 corresponding to, for example, a user such as the user 18, described above with respect to FIGS. 1A-1B. In one embodiment, to determine whether the depth image includes a human target, the target recognition, analysis, and tracking system may flood fill each target or object in the depth image and may compare each flood filled target or object to a pattern associated with a body model of a human in various positions or poses. The flood filled target, or the human target, that matches the pattern may then be scanned to determine values including, for example, measurements such as length, width, or the like associated with one or more body parts. For example, the flood filled target, or the human target, that matches the pattern may be isolated and a mask of the human target may be created. The mask may be created by, for example, flood filling the human target such that the human target may be separated from other targets or objects in the scene elements. The mask may then be analyzed to determine the location of one or more body parts.

In one embodiment, the target recognition, analysis, and tracking system may determine whether a human target in the depth image may have been previously scanned, at 310, before the human target may be scanned at 315. For example, the capture device such as the capture device 20 described above with respect to FIGS. 1A-2 may capture a scene in frames. Each frame may include a depth image. The depth image of each frame may be analyzed to determine whether the depth image may include a human target as described above. The depth image of each frame may further be analyzed to determine whether the human target may have been previously scanned for one or more body parts. For example, at 310, the target recognition, analysis, and tracking system may determine whether a human target in the depth image received, at 305, corresponds to a human target previously scanned at 315. In one embodiment, at 310, if the human target may not correspond to a human target previously scanned, the human target may then be scanned at 315. Thus, according to an example embodiment, a human target may be scanned once in an initial frame and depth image captured by the capture device that includes the human target.

According to another embodiment, the target recognition, analysis, and tracking system may scan the human target for one or more body parts in each received depth image that includes the human target. The scan results associated with, for example, the measurements for the one or more body parts may then be averaged, which will be described in more detail below.

Figure 7:
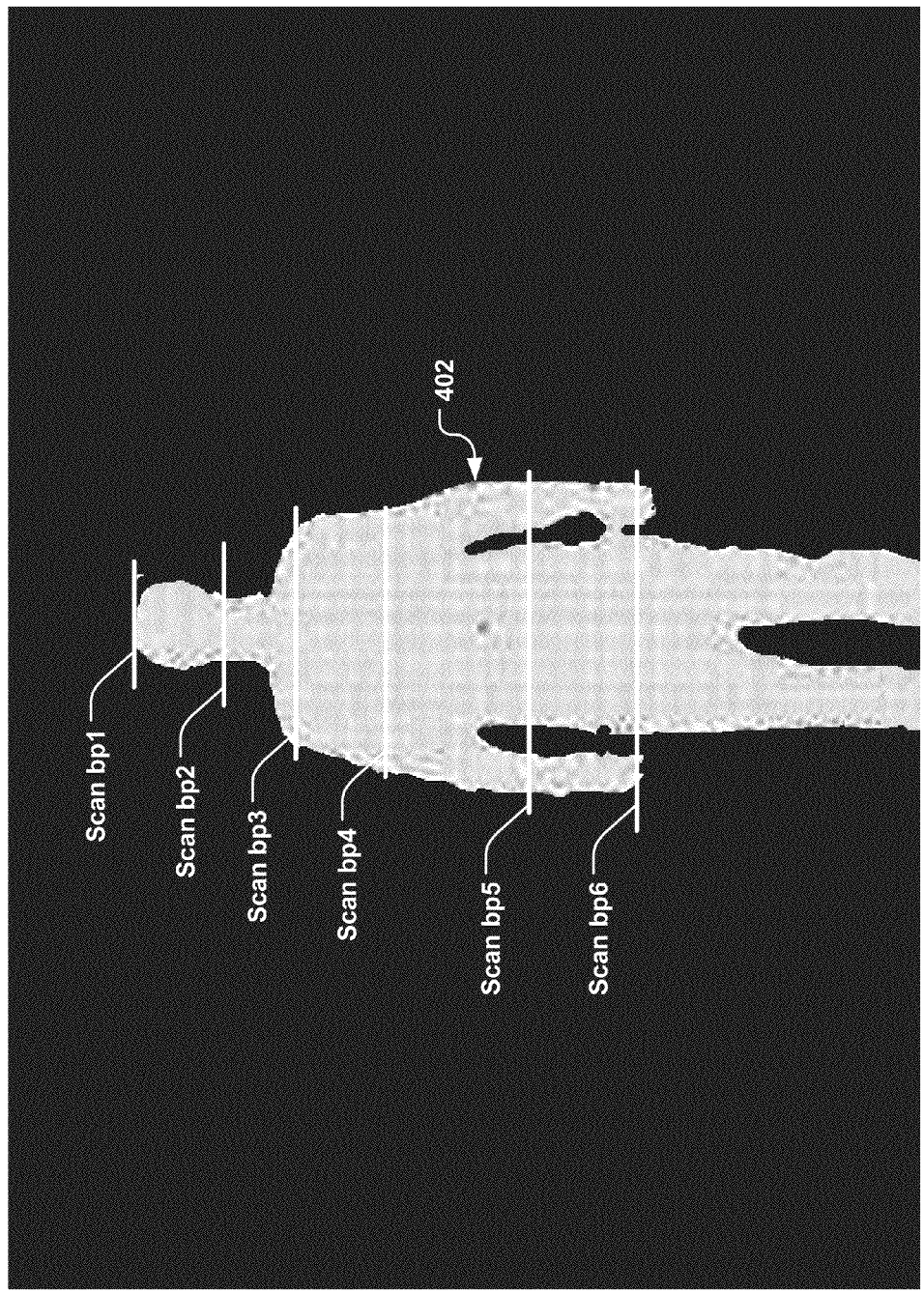
FIG. 7 illustrates an example embodiment of a depth image with a human target being scanned.

FIG. 7 illustrates an example embodiment of a depth image 400 that may include a human target 402 that may be scanned, for example, at 315. For example, after a valid human target such as the human target 402 may be found within the depth image 400, the background or the area of the depth image not matching the human target may be removed. A mask may then be generated for the human target 402 that may include values of the human target along, for example, an X, Y, and Z axis. According to an example embodiment, the mask of the human target 402 may be scanned for various body parts, starting with, for example a head.

As shown in FIG. 7, the information such as the bits, pixels, or the like associated with the matched human target 402 may be scanned to determine various locations such as scan bp1-scan bp6 that may be associated with various parts of the body of the human target 402. For example, after removing the background or area surrounding the human target 402 in the depth image, the depth image 400 may include the human target 402 isolated. The mask that may include X, Y, and Z values may then be generated for the isolated human target 402. The mask of the human target 402 may be scanned to determine a location, a measurement, and other information of various body parts. For example, a top of the mask of the human target 402 may initially be determined. As shown in FIG. 7, the top of the mask of the human target 402 may be associated with a location of the top of the head as indicated by scan bp1. After determining the top of the head, the mask may be scanned downward to then determine a location of a neck of the human target 402, a location of the shoulders of the human target 402, or the like.

Referring back to FIG. 5, at 320, a model such as a skeletal model of the human target may then be generated based on the scan. For example, according to one embodiment, various points or body parts determined by the scan may be used to position one or more joints in a model such as a skeletal. The one or more joints may define one or more bones that may correspond to a body part of a human. Thus, according to an example embodiment, at 320, a model may generated based on the location of various body parts determined by the scan at 315.

Figure 8:
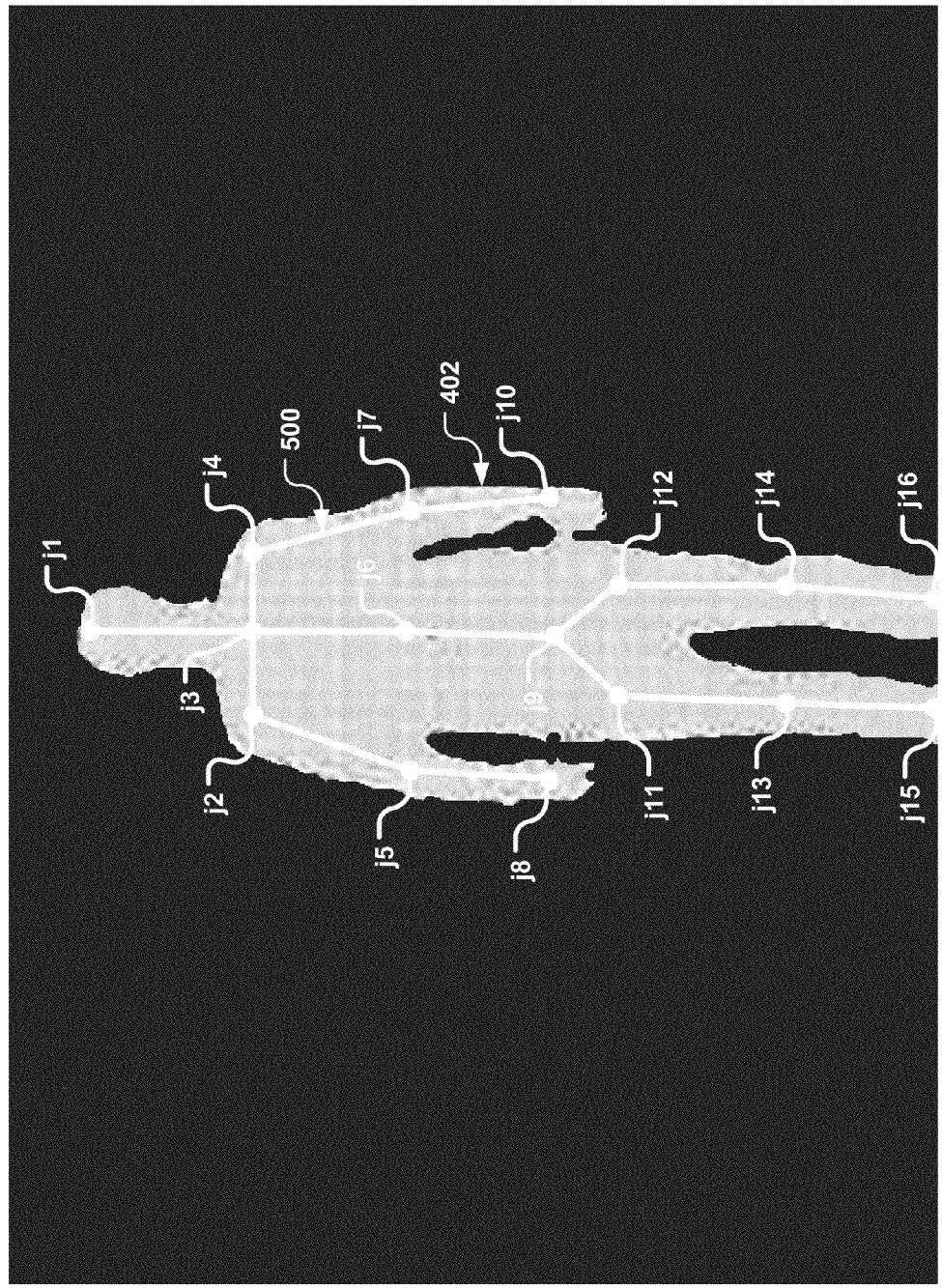
FIG. 8 illustrates an example embodiment of a depth image with a model that may be generated for the scanned human target.

FIG. 8 illustrates an example embodiment of a depth image with a model 500 such as a skeletal model that may be generated for the scanned human target 402. According to an example embodiment, the model 500 may include one or more data structures that may represent, for example, the human target 402 described above with respect to FIGS. 6-7 as a three-dimensional model. Each body part may be characterized as a mathematical vector having X, Y, and Z values that may define joints and bones of the model 500.

As shown in FIG. 8, the model 500 may include one or more joints j1-j16. According to an example embodiment, each of the joints j1-j16 may enable one or more body parts defined there between to move relative to one or more other body parts. For example, a model representing a human target may include a plurality of rigid and/or deformable body parts that may be defined by one or more structural members such as "bones" with the joints j1-j16 located at the intersection of adjacent bones. The joints j1-16 may enable various body parts associated with the bones and joints j1-j16 to move independently of each other. For example, the bone defined between the joints j5 and j8, shown in FIG. 8, corresponds to a forearm that may be moved independent of, for example, the bone defined between joints j13 and j15 that corresponds to a calf. As shown in FIG. 8, the model may be positioned or adjusted to fit within the human target 402 associated with the depth image 400 such that the joints j1-j16 and the bones defined therebetween in the model 500 may have X, Y, and Z values associated with the locations of the body parts determined based on, for example, the scan.

Referring back to FIG. 5, at 325, a background such as the non-human targets of a depth image may be removed to isolate a human target in a received depth image. For example, as described above, the target recognition, analysis, and tracking system may receive capture or observe depth image of a scene in frames. The target recognition, analysis, and tracking system may analyze each received depth image in a frame to determine whether a pixel may be associated with a background of the depth image. If a pixel may be associated with a background object such as one or more non-human targets, the pixel may be removed or discarded from the depth image such that the human target may be isolated in the depth image.

At 330, a model may be adjusted to fit within an isolated human target in a received depth image. For example, as described above, the target recognition, analysis, and tracking system may remove the background for each received depth image at 325 such that the human target may be isolated in the received depth image. In one embodiment, the target recognition, analysis, and tracking system may transpose or overlay the model generated at, for example, 320 over the depth image with the human target isolated. The model may then be adjusted to fit within the isolated human target in the received image. For example, the joints and bones of the model may be moved and/or rotated in an X direction, a Y direction, and/or a Z direction based on X, Y, and Z values associated with pixels of the isolated human target in a received depth image such that the model may be adjusted to fit within the human target.

According to an example embodiment, the model may be adjusted to fit within the isolated human target by determining whether, for example, a portion of the model such as one or more joints and bones may be outside of edges that may define the isolated human target. If, for example, a joint may be outside an edge of the isolated human target, the joint may be magnetized to the closest pixel using the depth values, or the Z values, of the isolated human target. For example, in one embodiment, if a joint may be outside of the human target, the target recognition, analysis, and tracking system may search for, or determine, the closet pixel associated with a body part of the human target using the depth values of the human target isolated in the received depth image. A joint that may outside of the human target isolated in the received depth image may then be magnetized to the closest pixel based on the search or determination such that the joint may be assigned the X, Y, and depth value associated with the closest pixel. According to an example embodiment, the joint may then be refined such that the joint may further be adjusted and assigned the X, Y, and Z values associated with a pixel in the middle or equidistance from the edges of the corresponding body part of the isolated target, which will be described in more detail below.

As described above, the target recognition, analysis, and tracking system may capture or observe a depth image in frames. In an example embodiment, the frames may be captured at a frequency such as 15 frames per second, 30 frames per second, 45 frames per second, or the like. According to one embodiment, the frequency of the frames captured each second may be selected based on a rate that may enable the target recognition, analysis, and tracking system to find, or determine, the closest pixel of the isolated human target to be a pixel that corresponds to the body part associated with a joint and/or bone of the model, which will be described in more detail below.

Figure 9B:
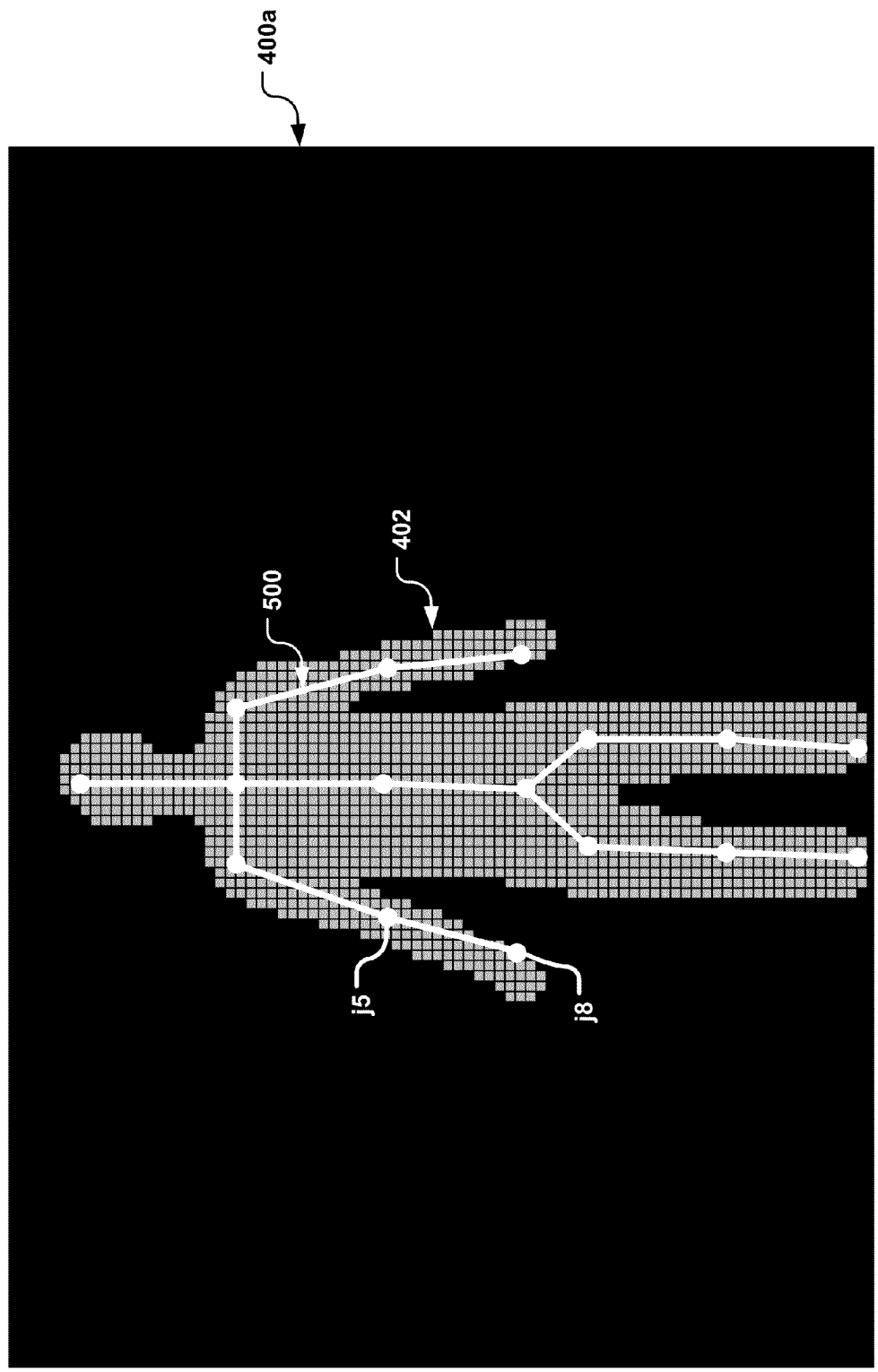
Figure 9C:
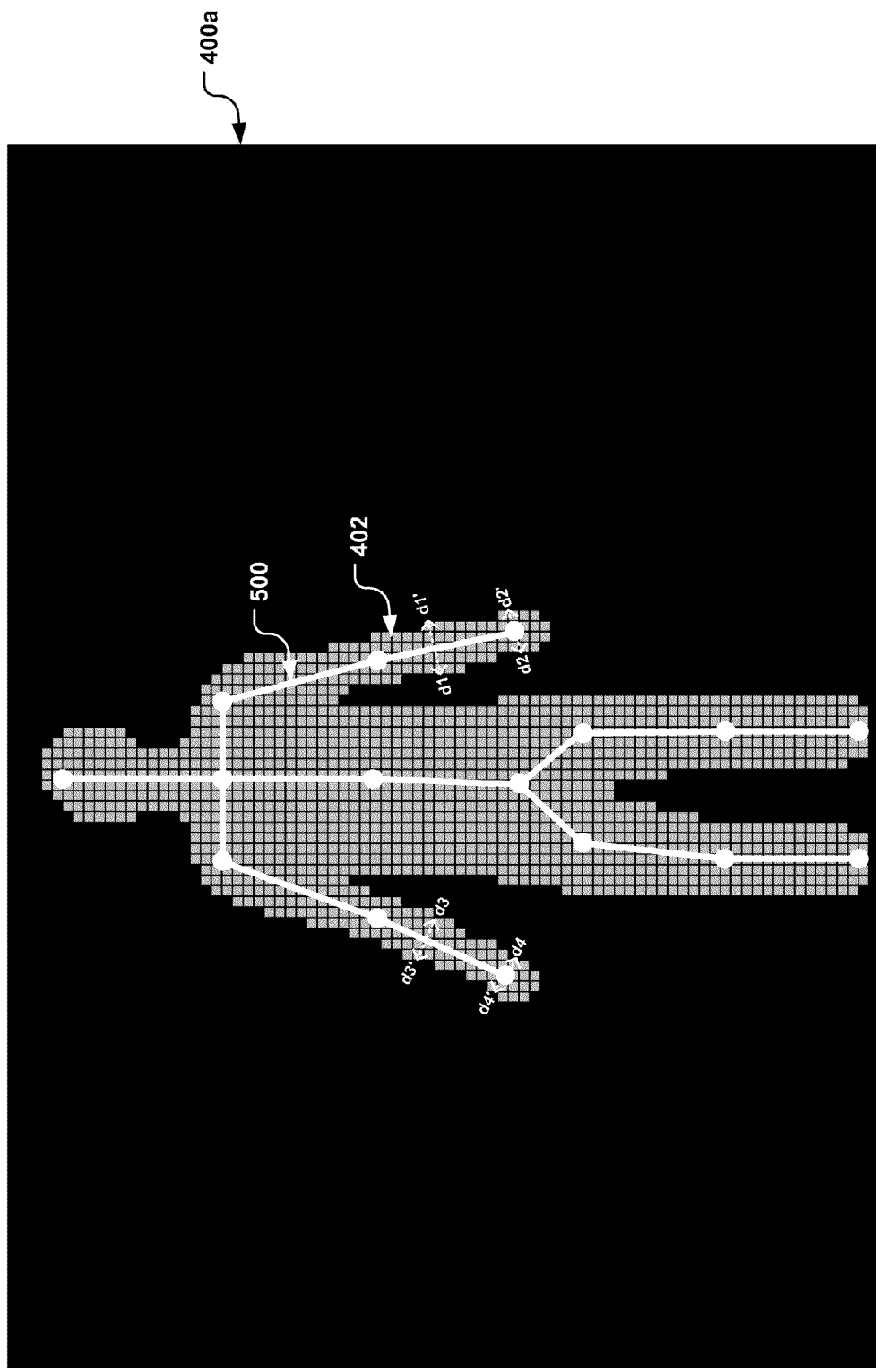

FIGS. 9A-9C illustrate example embodiments of a model being adjusted to fit within a human target isolated in a depth image. According to an example embodiment, upon receiving the depth image 400a, the target recognition, analysis, and tracking system may isolate the human target 402 in the depth image 400a by removing the background. Upon removing the background from the depth image 400a, the model 500 may be transposed or overlaid on the depth image 400a with the isolated human target 402 as shown in FIG. 9A. According to one embodiment, the model 500 may be transposed or overlaid on the depth image 400a in a position associated with the human target 402 in a depth image previously received in, for example, a frame. For example, the model 500 shown in FIG. 9A may be transposed or overlaid on the depth image 400a at the position of the human target 402 in the depth image 400 shown in FIG. 8. Thus, in one embodiment, each of the joints j1-j16 and the bones defined therebetween, shown in FIG. 9A, may be transposed or overlaid on the depth image 400a at the X, Y, and Z values of the joints j1-j16 and the bones defined therebetween of the human target 402 in a previously received depth image such as the depth image 400 shown in FIG. 8.

After overlaying or transposing the model 500 on the depth image 400a, the target recognition, analysis, and tracking system may determine whether a joint and/or bone of the model 500 may be outside pixels associated with the isolated human target 402 in the depth image 400a. To determine whether a joint and/or bone may be outside the pixel area, in one embodiment, the target recognition, analysis, and tracking system may determine whether each of the joints and/or bones that may be overlaid or transposed over a pixel in the depth image 400a that may have a valid depth value such as a non-zero depth value, a depth value less than or equal to a maximum distance that may be captured or observed by the capture device, or the like. For example, as described above, upon receiving the depth image 400a, the background 404 may be removed to isolate the human target 402. In one embodiment, upon removing the background 404, each of the pixels associated with the background 404 in the depth image may have an invalid depth value assigned thereto such as a zero depth value, a negative depth value, or the like. Thus, according to an example embodiment, upon removing the background 404, the pixels associated with the isolated human target 402 may include valid depth values whereas the remaining pixels in the depth image 400a may include invalid depth values.

In one embodiment, the target recognition analysis, and tracking system may identify a pixel in the depth image 400a that may be at the same location as each joint and/or bone of the model 500 based on, for example, the X and Y values of the joint and/or bone. The target recognition, analysis, and tracking system may then determine whether the pixel associated with each joint and/or bone may have a valid depth value. For example, the target recognition, analysis, and tracking system may examine the depth value of the pixel associated with each joint and/or bone to determine whether the pixel may have a valid, non-zero depth value such that the pixel may be associated with the human target 402 or whether the pixel may have an invalid depth value. According to one embodiment, if the depth value of the pixel at the location of, for example, a joint and/or a bone may have a valid depth value such as a non-zero depth value, the target recognition, analysis, and tracking system may determine that the joint and/or bone may be located on or within an edge of the isolated human target 402. Alternatively, if the depth value of the pixel at the location of, for example, a joint and/or a bone may have an invalid depth value, the target recognition, analysis, and tracking system may determine that the joint and/or bone may be outside the isolated human target 402 in the depth image 400a.

For example, the target recognition, analysis, and tracking system may identify a pixel associated with each of the joints j1-j16 and/or the bones defined therebetween to determine whether each of the joints j1-j16 and/or the bones defined therebetween may be outside the human target 402. As shown in FIG. 9A, in one embodiment, the target recognition, analysis, and tracking system may determine that each of the joints j1-j7 and j9-j16 and/or the bones defined therebetween may be on or within an edge of the human target 402 in the depth image 400a by examining depth values associated with pixels of the depth image 400a at the location of each of the joints j1-j7 and j9-j16 and/or the bones defined therebetween. The target recognition, analysis, and tracking system may further determine that the joint j8 and a portion of the bone defined between the joints j8 and j5 may be may be outside an edge of the human target 402 in the depth image 400a by examining, for example, a depth value associated with a pixel of the depth image 400a at the location of the joint j8.

In an example embodiment, if a joint and/or bone may be outside an edge of the human target, the joints and/or the bone may be magnetized to a closest pixel having a valid depth value. For example, as shown in FIG. 9A, the target recognition, analysis, and tracking system may determine that the joint j8 may be outside an edge of the human target 402 in the depth image 400a. After determining that the joint j8 may be outside of the human target 402, the target recognition, analysis, and tracking system may identify the closest pixel in the depth image 400a to the joint j8 that may have a valid depth value such that the pixel may be associated with an edge of the human target 402. The target recognition analysis, and tracking system may then magnetize the joint j8 to the closest pixel such that the joint may be assigned the X, Y, and depth value associated with the closest pixel.

In one embodiment, to identify the closest pixel to a joint such as the joint j8, the target recognition, analysis, and tracking system may initially examine the depth values of a first set of pixels adjacent to a pixel in the depth image 400a at the location of the joint j8. For example, the target recognition, analysis and tracking system may compare the depth values of each pixel adjacent to the pixel associated with the location of the joint j8 to an invalid depth value. If the each adjacent pixel may match the invalid depth value, the target recognition, analysis, and tracking system may examine a second set of pixels adjacent to the first set of pixels and so on until the target recognition, analysis, and tracking system may identify one or more pixels such as pixels p1 and p2 that may have a valid depth value.

After identifying one or more pixels that may have a valid depth value, the target recognition, analysis, and tracking system may then calculate a distance between, for example, the joint j8 and the one or more pixels such as the pixels p1 and p2 that may have valid depth values. For example, the target recognition analysis, and tracking system may use the X, Y, and/or Z values (or depth values) associated with the pixel p1 and the X, Y, and/or Z value associated with the joint j8 to calculate a distance d between the pixel p1 and the joint j8. The target recognition analysis, and tracking system may further use the X, Y, and/or Z values (or depth values) associated with the pixel p2 and the X, Y, and/or Z value associated with the joint j8 to calculate a distance d' between the pixel p2 and the joint j8.

The target recognition, analysis, and tracking system may then compare the calculated distances d and d' to determine the closest pixel, pixel p1 or p2, to joint j8. According to an example embodiment, based on the comparison, the target recognition, analysis, and tracking system may select the pixel that may have the smallest calculated distance as the closest pixel to the joint j8. For example, in one embodiment, the target recognition, analysis, and tracking system may calculate a first value of, for example, 10 millimeters for the distance d and a second value of, for example, 15 millimeters for the distance d'. The target recognition, analysis, and tracking system may then compare the first and second values of 10 millimeters and 15 millimeters associated with the distances d and d'. Based on the comparison, the target recognition, analysis, and tracking system may select the pixel p1 as the closest pixel to the joint j8.

The target recognition analysis, and tracking system may then magnetize the joint j8 to the pixel p1 as shown in FIG. 9B such that the joint j8 may be assigned the X, Y, and depth value associated with the pixel p1.

According to an example embodiment, if the distances such as the distance d and d' are equal, the target recognition, analysis, and tracking system may analyze the joint j8 to determine that the joint j8 may be associated with an arm of the model 500. Based on that analysis, the target recognition, analysis and tracking system may then estimate whether to magnetize the joint j8 to pixel p1 or p2. For example, upon determining that the joint j8 may be associated with the arm of the model 500, the target recognition, analysis, and tracking system may determine to magnetize the joint j8 in an outward direction due to the estimation of where an arm of the human target 402 may most likely be positioned. The target, analysis, and tracking system may then magnetize the joint j8 to pixel p1 in the outward direction.

In one embodiment, upon identifying the closest pixel to a joint outside the human target 402, the target, recognition, analysis, and tracking system may adjust one or more joints that may be related to the joint outside the human target 402. For example, the shoulder joints j2, j3, and j4 may be related to each other such that the distance or measurements between each of the joints may remain the same as the distance or measurements determined by the scan. If the a shoulder joint j 2 may be outside the human target 402 shown in FIGS. 9A-9C, the target recognition, analysis, and tracking system may adjust joint j2 as described above. According to an example embodiment, the target, recognition, analysis, and tracking system may further adjust joints j3 and j4 based on the adjustments to joint j2 such that the distance or measurements between the joints j2, j3, and j4 remain the same distance or measurements determined by the scan.

Additionally, according to an example embodiment, the model 500 may be initially adjusted by positioning a joint associated with, for example, a torso of the model 500 such as the joint j6 at a centroid of the human target 402. For example, the target recognition, analysis, and tracking system may calculate the centroid or a geometric center of the human target 402 based on one or more measurements determined by the scan. The target recognition, analysis, and tracking system may then adjust, for example, joint j6 that may be associated with a torso of the model at a pixel of the human target 402 associated with the location of the centroid. The remaining joints j1-j5 and j7-j16 may then be moved in, for example, the X, Y, and Z directions based on the adjustments made to, for example, the joint j6 such that the joints j1-j5 and j7-j16 may maintain their respective distances and/or measurements based on the scan.

After magnetizing each of the joints and/or bones to the closest pixel, the target recognition, analysis, and tracking system may then refine each of the joints and/or bones such that the joints and/or bones may be positioned equidistance from the edges of a respective body part of the human target. For example, after magnetizing the joint j8 to the pixel p1, as shown in FIG. 9B, the joints j1-j16 and the bones therebetween may be refined such that the joints j1-j16 may be equidistant from each edge of a body part of the human target 402, as shown in FIG. 9C.

In one embodiment, to refine the joints j1-j16, the target recognition system may calculate an edge-to-edge distance a body part of the human target 402 based on the location of each of the joints j1-j16 and/or the bones defined therebetween. For example, the target recognition, analysis, and tracking system may calculate an edge-to-edge distance for joint j8 using the location such as the X, Y, and Z (or depth values) of pixel p1 at a first edge e1 and a pixel that may be parallel to pixel p 1 at a second edge e2 such as pixel p3. The target, recognition, analysis, and tracking system may then divide the calculated edge-to-edge distance such that a middle point may be generated having an equal distance d1 and d1' to the edges e1 and e2. The joint j8 may then be assigned, for example, the X, Y, and Z (or depth) values the middle point. Thus, according to an example embodiment, the target recognition, analysis, and tracking system may refine each of the joints j1-16 such that the model 500 may be centered at the corresponding body part of the human target 420 as shown in FIG. 9C.

Referring back to FIG. 5, at 330 the model may be adjusted to fit within the isolated human target by further determining whether, for example, one or more joints and bones may be associated with a valid depth value of a corresponding body part of the human target. For example, in one embodiment, a user such as the user 18 described above with respect to FIGS. 1A and 1B may have his or her arm in front of another body part such that depth values of the human target that may be associated with the user may reflect an arm in front of another body part of the human target. In one embodiment, a joint associated with the arm of the model may be at a location that may be within an edge of the human target, but the joint may not be associated with a valid depth value of the arm of the human target.

According to an example embodiment, as described above, the target recognition, analysis, and tracking system may then examine one or more sets of pixels adjacent to the pixel at the location of the joint to determine whether the joint may be associated with a valid depth value of a corresponding body part of the human target. For example, the target recognition, analysis, and tracking system may compare the depth value of the pixel at the location of the joint with the depth values of a first set of adjacent pixels. According to one embodiment, if the difference between the depth values of the pixel at the location of the joint and a pixel in, for example, the first set of pixels, may be greater than an edge tolerance value, the target recognition, analysis, and tracking system may determine that an edge may be defined between the two pixels.

The target recognition, analysis and tracking system may then determine whether to magnetize the joint to the pixel that may have the smaller depth value, or the depth value closer to the capture device, based on the body part associated with the joint. For example, if the joint may be associated with an arm, as described above, the target recognition, analysis and tracking system may magnetize the joint to the pixel having the smaller depth value based on an estimation by the target recognition, analysis, and tracking system that the edge may be associated with an arm of human target in the depth image. In one embodiment, the target recognition, analysis, and tracking system may make the estimation based on, for example, the location of a body part such as the arm in a depth image associated with a previously captured frame. The target recognition, analysis, and tracking system may further make the estimation based on one or more stored body poses. For example, the target recognition, analysis, and tracking system may include a hierarchy of potential body poses of a model. The target recognition, analysis, and tracking system may compare the pose of the model that may have been adjusted using a depth image of a previously captured frame with the stored body poses to determine whether to magnetize a joint to the pixel having a smaller depth value, or the pixel closer to the capture device.

Figure 10A:
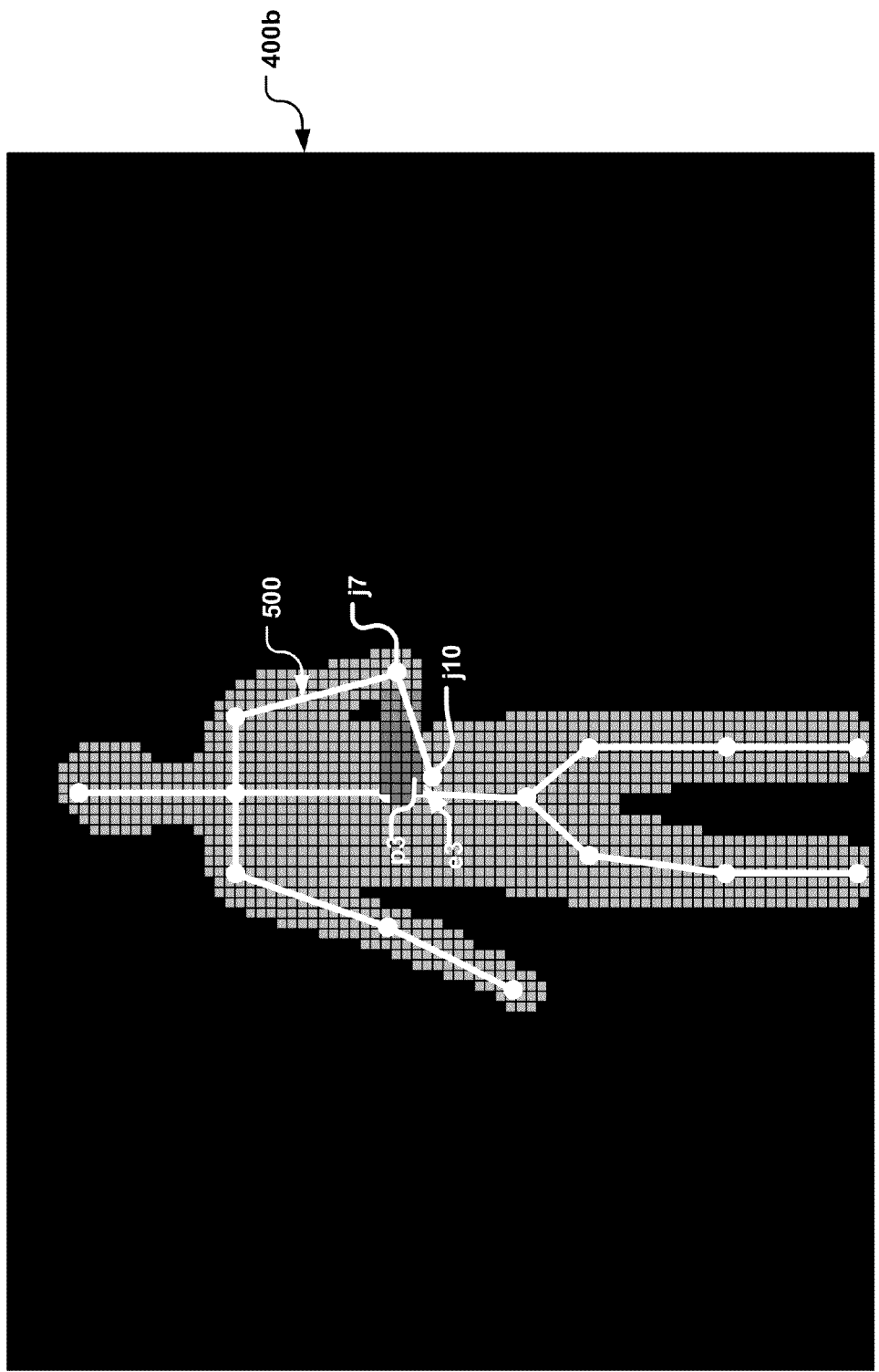
FIGS. 10A-10C illustrate example embodiments of a model being adjusted to fit within a human target isolated in a depth image.
Figure 10B:
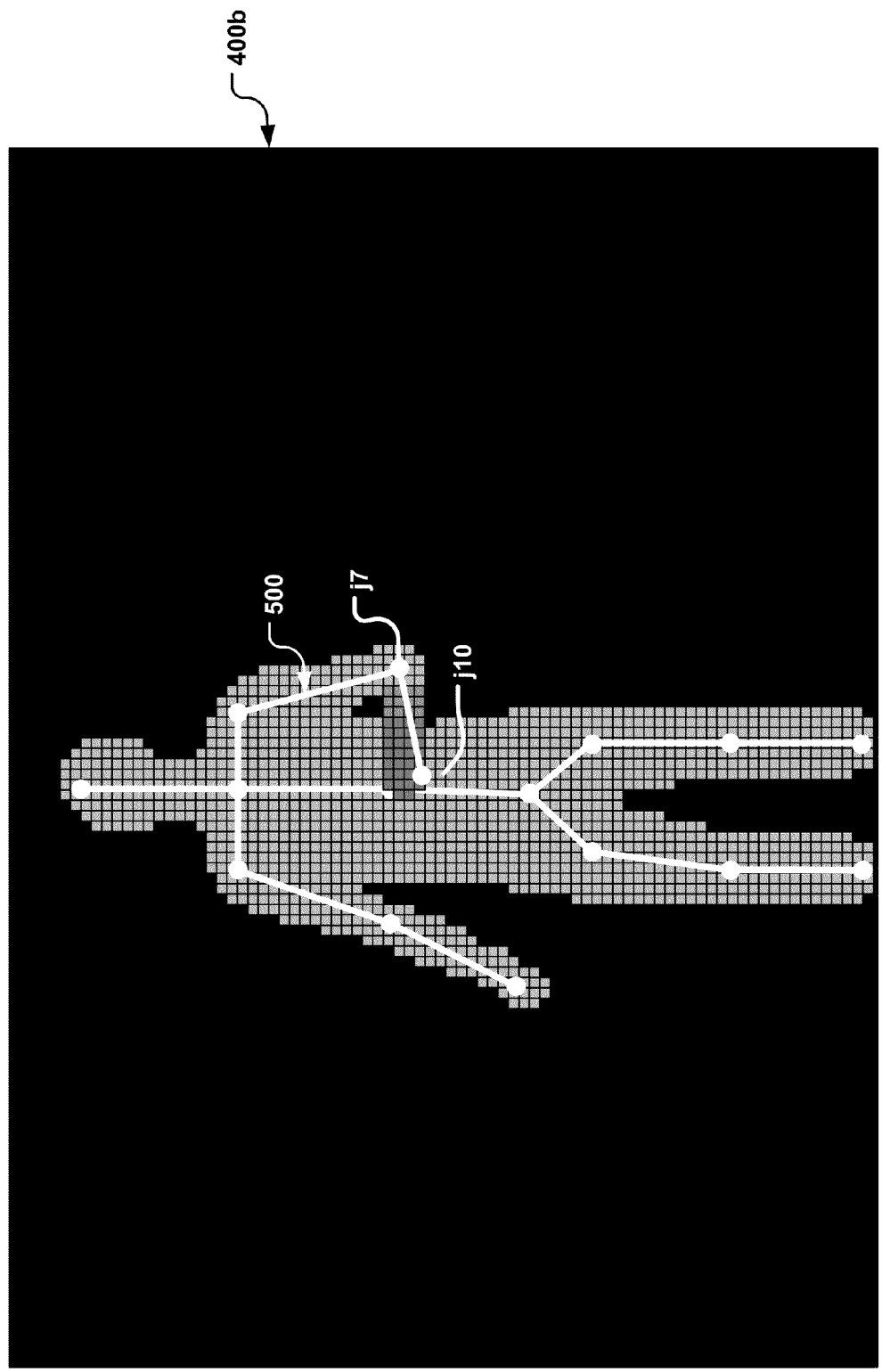
Figure 10C:
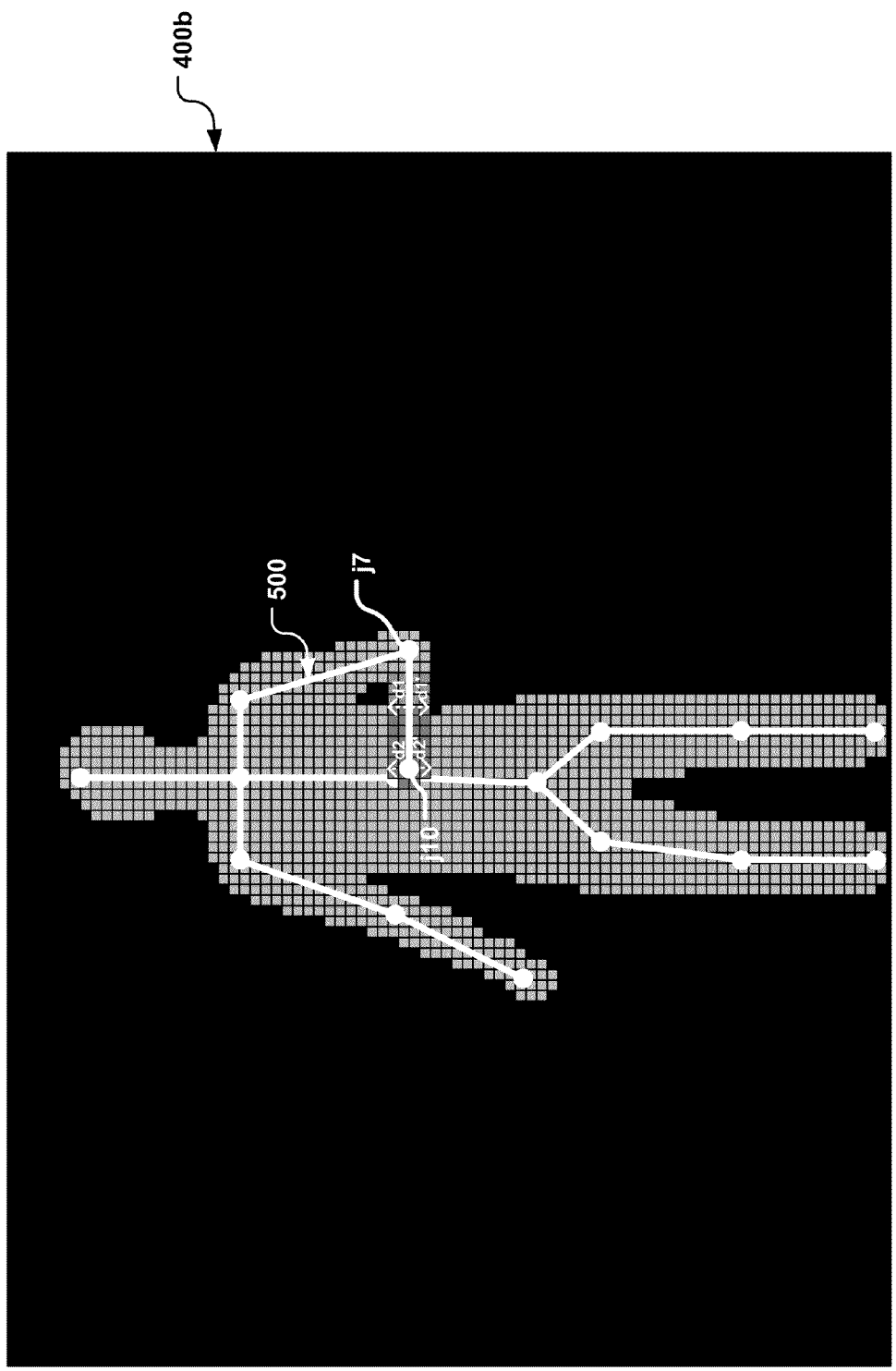

FIGS. 10A-10C illustrate example embodiments of a model being adjusted to fit within a human target isolated in a depth image 400b. As shown in FIG. 10A, the joint j10 may be at a location of a valid depth value within the human target 402 in the depth image 400b. In one embodiment, as described above, the target recognition, analysis, and tracking system may determine whether, for example, the joint j10 may be associated with a valid depth value of an arm of the human target 402. For example, the target recognition, analysis, and tracking system may compare the depth value of the pixel at the location of the joint j10 with a set of adjacent pixels including pixel p3. If the difference between, for example, the pixel at the location of the joint j10 and the pixel p3 in the set of adjacent pixels may be greater than an edge tolerance value, the target recognition, analysis, and tracking system may determine that an edge may be defined between the two pixels. For example, the edge tolerance value may be 20 millimeters. If the depth value of the pixel at the location of joint j10 may be 100 millimeters and the depth value of the pixel p3 may be 70 millimeters, the target recognition, analysis, and tracking system may determine that an edge e3 may be defined between the two pixels.

The target recognition, analysis and tracking system may then determine whether to magnetize the joint j10 to the pixel p3. For example, as described above, the target recognition, analysis and tracking system may determine whether to magnetize the joint j10 the pixel p3 based on an estimation by the target recognition, analysis, and tracking system that the edge e3 may be associated with an arm of human target 402 in the depth image 400b.

If the target recognition, analysis, and tracking system may determine that the joint j3 should be magnetized to the pixel p3, the target recognition analysis, and tracking system may adjust the joint j10 such that the joint j10 may be assigned for example the X, Y, and Z (or depth) values of the pixel p3. The target recognition, analysis, and tracking system may then refine the joints j1-j16 as described above.

Referring back to FIG. 5, at 335, the adjusted model may be processed. For example, in one embodiment, the target recognition, analysis, and tracking system may process the adjusted model by, for example, generating a motion capture file of the modeling including the adjustments thereto.

The target recognition, analysis, and tracking system may also process the adjusted model by mapping one or more motions or movements applied to the adjusted model to an avatar or game character such that the avatar or game character may be animated to mimic the user such as the user 18 described above with respect to FIGS. 1A and 1B. For example, the visual appearance of an on-screen character may then be changed in response to changes to the model being adjusted.

In one embodiment, the adjusted model may process the adjusted model by providing the adjusted model to a computing environment such as the computing environment 12 described above with respect to FIGS. 1A-4. The computing environment may include a gestures library that may be used to determine controls to perform within an application based on positions of various body parts in the skeletal model.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A method, comprising:
    receiving a depth image of a scene;
    isolating a target in the depth image;
    determining that a joint of a computer model that corresponds to the target is outside an edge of the isolated target;
    determining a new location for the joint of the computer model based on a pixel within the isolated target; and
    updating the computer model based on the new location of the joint.

2. The method of claim 1, wherein the computer model comprises a skeletal model having joints and bones.

3. The method of claim 1, wherein determining the new location for the joint of the computer model based on the pixel within the isolated target comprises:
    examining a set of pixels adjacent to the pixel within the isolated target to determine whether at least one of the pixels in the set of pixels has a valid depth value;
    calculating distances between the pixel within the isolated target and each pixel in the set of pixels having a valid depth value;
    selecting a shortest distance from the calculated distances as a closest pixel; and
    determining the new location for the joint of the computer model based on the closest pixel.

4. The method of claim 1, wherein determining the new location for the joint of the computer model based on the pixel within the isolated target comprises:
    determining the new location of the joint as having an X value, a Y value, and a Z value associated with the pixel.

5. The method of claim 1, wherein determining the new location for the joint of the computer model based on the pixel within the isolated target comprises:
    selecting the pixel within the isolated target based on the pixel being equidistant from a first edge of the isolated target associated with a pixel closest to a prior location for the joint, and a second edge of the isolated target associated with a pixel opposite the pixel closest to the prior location for the joint.

6. The method of claim 5, wherein determining the new location for the joint of the computer model based on the pixel within the isolated target comprises:
    determining the new location of the joint as having an X value, a Y value, and a Z value associated with the pixel that is equidistant from the first edge and the second edge.

7. The method of claim 1, wherein isolating the target in the depth image comprises:
    removing data associated with a background of the depth image.

8. A computer-readable recording medium having stored thereon computer executable instructions for tracking a model, that when executed upon a computer, cause the computer to perform operations comprising:
    receiving a depth image of a scene;
    isolating a target in the depth image;
    determining that a joint of a computer model that corresponds to the target is outside an edge of the isolated target;
    determining a new location for the joint of the computer model based on a pixel within the isolated target; and
    updating the computer model based on the new location of the joint.

9. The computer-readable recording medium of claim 8, wherein the computer model comprises a skeletal model having joints and bones.

10. The computer-readable recording medium of claim 8, wherein determining the new location for the joint of the computer model based on the pixel within the isolated target comprises:
    examining a set of pixels adjacent to the pixel within the isolated target to determine whether at least one of the pixels in the set of pixels has a valid depth value;
    calculating distances between the pixel within the isolated target and each pixel in the set of pixels having a valid depth value;
    selecting a shortest distance from the calculated distances as a closest pixel; and
    determining the new location for the joint of the computer model based on the closest pixel.

11. The computer-readable recording medium of claim 8, wherein determining the new location for the joint of the computer model based on the pixel within the isolated target comprises:
    determining the new location of the joint as having an X value, a Y value, and a Z value associated with the pixel.

12. The computer-readable recording medium of claim 8, wherein determining the new location for the joint of the computer model based on the pixel within the isolated target comprises:
    selecting the pixel within the isolated target based on the pixel being equidistant from a first edge of the isolated target associated with a pixel closest to a prior location for the joint, and a second edge of the isolated target associated with a pixel opposite the pixel closest to the prior location for the joint.

13. The computer-readable recording medium of claim 12, wherein determining the new location for the joint of the computer model based on the pixel within the isolated target comprises:

determining the new location of the joint as having an X value, a Y value, and a Z value associated with the pixel that is equidistant from the first edge and the second edge.

14. The computer-readable recording medium of claim 8, wherein isolating the target in the depth image comprises:
removing data associated with a background of the depth image.

15. A system for tracking a model, comprising:
a memory bearing instructions that, upon execution by a processor, cause the system at least to:
receive a depth image of a scene;
isolate a target in the depth image;
determine that a joint of a computer model that corresponds to the target is outside an edge of the isolated target;
determine a new location for the joint of the computer model based on a pixel within the isolated target; and
update the computer model based on the new location of the joint.

16. The system of claim 15, wherein the computer model comprises a skeletal model having joints and bones.

17. The system of claim 15, wherein the instructions that, upon execution by the processor, cause the system at least to determine the new location for the joint of the computer model based on the pixel within the isolated target further cause the system at least to:
examine a set of pixels adjacent to the pixel within the isolated target to determine whether at least one of the pixels in the set of pixels has a valid depth value;
calculate distances between the pixel within the isolated target and each pixel in the set of pixels having a valid depth value; and
select a shortest distance from the calculated distances as the closest pixel.

18. The system of claim 15, wherein the instructions that, upon execution by the processor, cause the system at least to determine the new location for the joint of the computer model based on the pixel within the isolated target further cause the system at least to:
determine the new location of the joint as having an X value, a Y value, and a Z value associated with the pixel.

19. The system of claim 15, wherein the instructions that, upon execution by the processor, cause the system at least to determine the new location for the joint of the computer model based on the pixel within the isolated target further cause the system at least to:
select the pixel within the isolated target based on the pixel being equidistant from a first edge of the isolated target associated with a pixel closest to a prior location for the joint, and a second edge of the isolated target associated with a pixel opposite the pixel closest to the prior location for the joint.

20. The system of claim 19, wherein the instructions that, upon execution by the processor, cause the system at least to determine the new location for the joint of the computer model based on the pixel within the isolated target further cause the system at least to:
determine the new location of the joint as having an X value, a Y value, and a Z value associated with the pixel that is equidistant from the first edge and the second edge.

\* \* \* \* \*